Feb. 21, 1950 W. R. RAMBO 2,498,577

COMBINED OSCILLATOR AND REACTANCE TUBE STRUCTURE

Filed Dec. 17, 1945 2 Sheets-Sheet 1

INVENTOR
WILLIAM R. RAMBO
BY
William D. Hall
ATTORNEY

Feb. 21, 1950 W. R. RAMBO 2,498,577

COMBINED OSCILLATOR AND REACTANCE TUBE STRUCTURE

Filed Dec. 17, 1945 2 Sheets-Sheet 2

INVENTOR.
WILLIAM R. RAMBO
BY Harry M. Saragovitz
Attorney

Patented Feb. 21, 1950 2,498,577

UNITED STATES PATENT OFFICE 2,498,577

COMBINED OSCILLATOR AND REACTANCE TUBE STRUCTURE

William R. Rambo, Cambridge, Mass., assignor to The United States of America as represented by the Secretary of War Application December 17, 1945, Serial No. 635,588

13 Claims. (Cl. 332—28)

My present invention relates to circuits operating in the ultra-high frequency region or higher and more particularly to an electronic device capable of producing frequency modulation of such circuits.

One method of frequency modulation utilizes the modulating voltage to control the frequency of the generated oscillations. The frequency control may be accomplished with the aid of the reactance tube acting in shunt with the oscillating circuit, as used in automatic frequency-control systems. Application of the modulation voltage to the grid of the reactance tube will vary the reactive current drawn by the plate electrode of the tube, and so will affect the oscillating frequency.

In practical applications it is difficult to obtain a precise knowledge of component values at ultra-high frequencies, thus making equations relating to the use of reactance tubes difficult to apply to circuit design. Conventional reactance tube designs have the cathode terminal common (that is, at the same R.-F. potential) to both the input and output circuits. A variation in this design is to use a common-grid circuit, that is, a reactance tube in which a grid terminal is common to both the input and output circuits. A reactance tube utilizing a common-grid circuit is explained in my copending application Serial No. 627,046, filed November 6, 1945, now Patent No. 2,485,919, issued October 25, 1949.

It is an object of this invention to provide a novel means of frequency modulation effective at ultra-high frequencies, such means including a common-grid reactance tube circuit.

It is further an object of this invention to provide a novel method of inductively coupling a reactance tube to an oscillator which is effective at ultra-high frequencies, thus enabling a reactance tube to be used for modulating the frequency of an ultra-high frequency oscillator.

Generally, this invention utilizes two ultra-high frequency triode type tubes commonly referred to as "lighthouse" type tubes placed side by side. One of said tubes is used as a conventional grounded-grid oscillator with plate and cathode circuits tuned by a short-circuited section of transmission line. The other of said tubes is used as a reactance tube and is inductively coupled to the plate circuit of said first tube.

Other objects, features and advantages of this invention will suggest themselves to those skilled in the art and will become apparent from the following description of the invention taken in connection with the accompanying drawing, in which.

Figure 1:
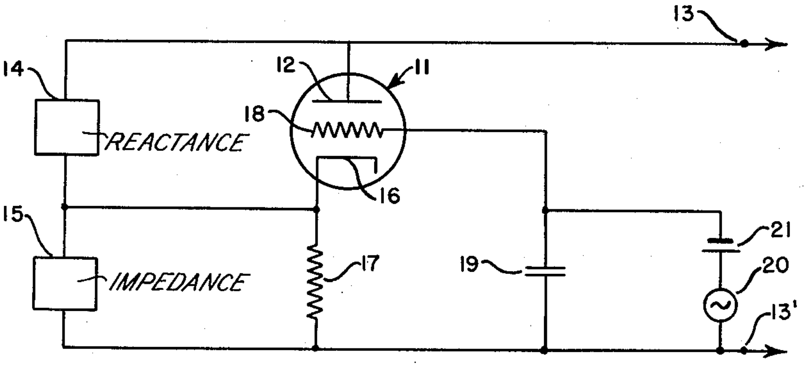
Fig. 1 is a schematic diagram of a common-grid reactance tube circuit used in this invention.

Referring now more particularly to Fig. 1, the reactance circuit, in the present instance, comprises a triode 11. The plate 12 of the tube 11 is connected to one of the terminals 13 to which the radio frequency voltage from the oscillator tank circuit (not shown) is applied. A phase-splitting network comprising the series combination of a reactance element 14 and an impedance 15 is connected across the R.-F. terminals 13 and 13'. The cathode 16 of tube 11 is connected to the junction of the element 14 and impedance 15, and also through resistor 17 to the end of impedance 15 which is connected to the R.-F. terminal 13'. The grid 18 of tube 11 is connected through a capacitor 19, which presents substantially a short-circuit at radio frequencies to the R.-F. terminal 13'. A source 20 of modulating voltage in series with a bias supply 21, is connected across the capacitor 19, which constitutes substantially an open circuit at the modulating frequency.

The common-grid reactance tube, as explained in the aforesaid copending application, operates in a manner similar to that of a conventional common-cathode reactance tube having a compensating network to prevent parasitic amplitude modulation, and is characterized by the additional feature that the plate-grid capacitance of the tube does not affect the functioning of the circuit at ultra-high frequencies.

Figures 2, 3:
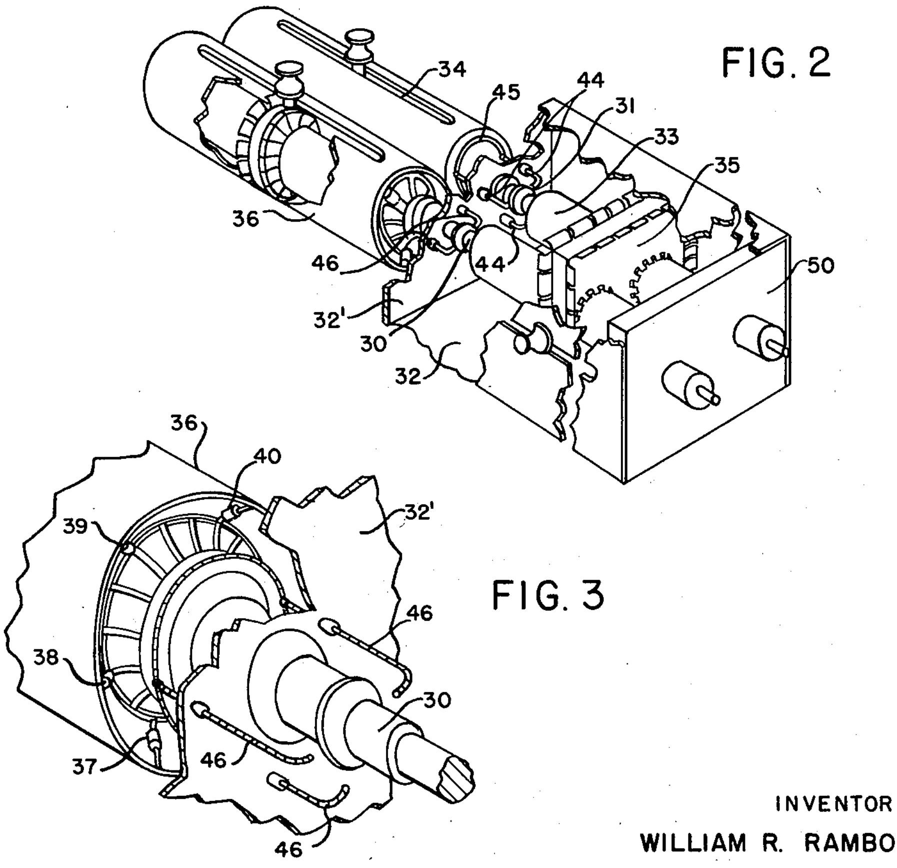
Fig. 2 is a cut-away perspective view of a portion of an oscillator and reactance tube embodying the principles of this invention.
Fig. 3 is an enlarged portion of the reactance tube shown in Fig. 2.
Figure 4:
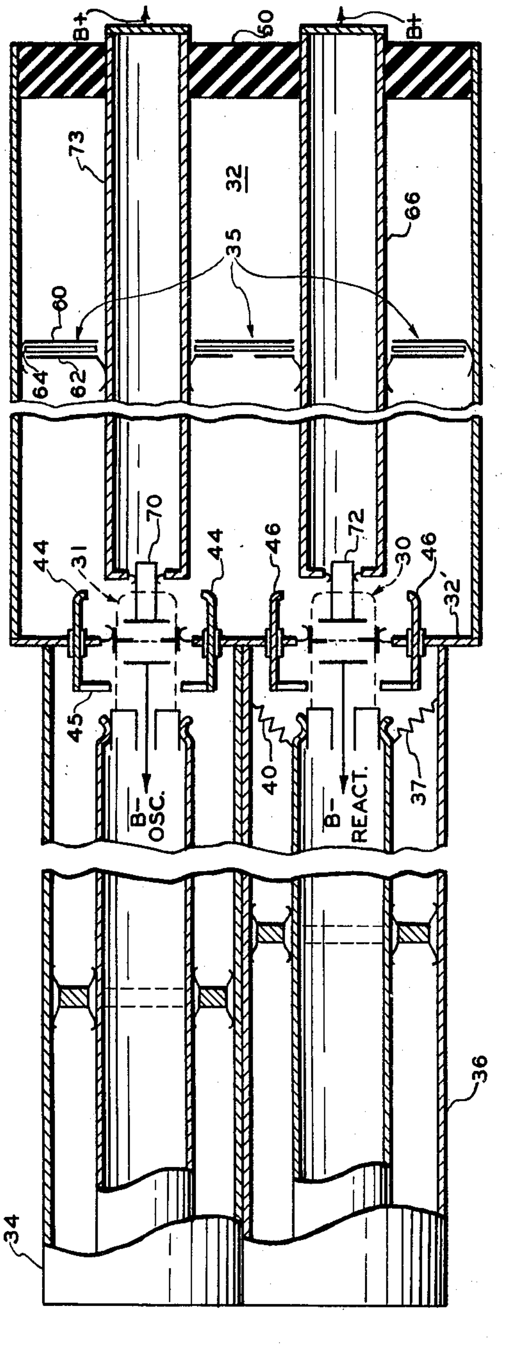
Fig. 4 is a horizontal cross section of the structure in Fig. 2.

Referring now more particularly to Figs. 2 and 4, which show two of the high frequency triodes 30 and 31, commonly referred to as "lighthouse" tubes, placed side by side, the plates of said two tubes are coupled together in a resonant cavity 32 and the grids of these tubes are in a common plane with the wall 32' of the cavity 32. Tube 31 is used as a conventional grounded-grid oscillator with plate and cathode circuits tuned by short-circuited sections of transmission lines 33 and 34, respectively. Tube 30 is used as a reactance tube inductively coupled to the plate circuit of said tube 31. Separate biasing of the grids of tubes 30 and 31 is made possible by the use of two power supply circuits and a blocking capacitor in the plate shorting plunger 35 which is common to the plate circuits of both tubes 30 and 31. The blocking capacitor action is provided by making shorting plates 35 up of spaced metallic surfaces 60 and 62 separated by a mica plate 64. An insulating material 50 is used to support the plate D. C. supply lines to permit isolation of the supply voltages.

Feed-back for the oscillator 31 is augmented by the use of wire probes 44 which extend through the grid plane (wall 32') to the plate and cathode cavities and are spaced on a circle centered on the tube center line. In the cathode cavity the probes are linked by a wire loop 45. In the plate cavity the probes are bent toward the plate of the tube. The amount of feed-back can be controlled by varying the distance of the probes from the plate.

The phase-splitting network illustrated in Fig. 1 by reactance 14 and impedance 15, as shown in Fig. 2 consists of the plate-cathode inter-electrode capacitance of the reactance tube 30, augmented when necessary by electrostatic feed-back which is obtained by wire probes 46 between plate and cathode cavities. The counterpart of the impedance 15 shown in Fig. 1 is in Fig. 2 the parallel combination of the reactance tube grid-cathode capacitance and an inductance afforded by a shorted section of concentric line 36.

The resistor 17 shown in Fig. 1 is represented in Fig. 3 by resistors 37, 38, 39 and 40 secured radially across the grid-cathode concentric line at the tube end of the line.

The plate of the reactance tube is inductively coupled to the oscillator tube by virtue of the fact that the plates and plate terminals 70 and 72 of said tubes, as well as the lines 33 and 36 extending therefrom, are in the same resonant cavity 32. A modulating voltage is applied to the reactance tube grid and varies the circulating reactance current in the plate tank circuit of the reactance tube. The frequency of the oscillator output is thereby altered in accordance with the applied modulation.

While there has been described what is at present considered to be the preferred embodiment of this invention, it will be obvious to those skilled in the art that various changes and modifications may be made therein without departing from the scope of the invention.

The invention claimed is:

1. In combination, first and second vacuum tubes, each having axially-spaced plate and cathode electrodes, a common resonator structure for tuning the circuits of two like electrodes of said tubes, both of said like electrodes being within said structure to provide inductive coupling therebetween, the other two like electrodes being outside said resonator structure, means including said structure for rendering one tube self-oscillating, and means to phase displace the plate current of the other tube with respect to the plate current of said one tube by such an amount that the circuit of said other tube reflects a reactive component into the oscillating circuit of said one tube.

2. The combination set forth in claim 1, wherein said like electrodes are the plates of said tube.

3. The combination set forth in claim 2, wherein said tubes are mounted on a wall of said resonator structure, and wherein each of said tubes has a grid which lies substantially in said wall and is electrically coupled thereto.

4. The combination set forth in claim 1, including means to vary the transconductance of said other tube in accordance with a modulation potential, whereby the frequency of said oscillator is modulated in accordance with said potential.

5. A radio frequency assembly comprising a pair of electron tubes each having at least axially-spaced cathode and anode electrodes, a resonator structure, means mounting said tubes side by side in a wall of said resonator structure, said anode and cathode electrodes being positioned on opposite sides of said wall, and transmission lines extending in parallel from said anodes into said structure to provide inductive coupling between said anodes.

6. An assembly as set forth in claim 5, wherein each of said tubes includes a grid coupled to said wall and in a common plane therewith.

7. An assembly as set forth in claim 6, including means to shift the phase of the radio frequency potential applied to the cathode of one of said tubes by an amount less than 180° with respect to the radio frequency potential applied to the anode of said tube, whereby the plate current of said tube has a reactive component therein.

8. An assembly as set forth in claim 7, including means to vary the transconductance of said tube thereby to vary the amplitude of said reactive component.

9. An assembly as set forth in claim 5, including resonant means to render one tube self-oscillating, and means to phase displace the plate current in the other tube by an amount less than 180° relative to the plate current in one tube, whereby said other tube reflects reactance into the circuit of said oscillating tube.

10. A combined radio frequency oscillator and reactance tube assembly comprising a pair of electron tubes each having axially-spaced planar cathode, grid and anode electrodes, a first resonator structure, means mounting said tubes side by side in a wall of said resonator structure in such a manner that said grids lie substantially in the plane of said wall and are coupled thereto, parallel lines extending from said anodes into said resonator structure whereby the anodes of said tubes are electromagnetically coupled, means including said resonator structure to render one tube oscillating, a second resonator structure including said wall for tuning the cathode of the other tube, and a phase splitting network including said second resonator structure to phase displace the plate current of said other tube with respect to the plate current of said one tube, whereby said other tube reflects a reactance component into said first resonator structure.

11. A structure as set forth in claim 10, including means to vary the amplitude of said reactance component thereby to vary the oscillating frequency of said one tube.

12. A structure as set forth in claim 10, including means to vary the transconductance of said other tube to thereby vary the amplitude of said reactance component and the oscillating frequency of said one tube.

13. A structure as set forth in claim 10, wherein said phase splitting network includes the anode-cathode capacitance of said other tube.

WILLIAM R. RAMBO.

REFERENCES CITED

The following references are of record in the file of this patent:

UNITED STATES PATENTS

| Number | Name | Date |
|---|---|---|
| 2,241,976 | Blewett et al. | May 13, 1941 |
| 2,323,598 | Hathaway | July 6, 1943 |
| 2,351,463 | Usselman | June 13, 1944 |
| 2,421,725 | Stewart | June 3, 1947 |
| 2,423,443 | Fay | July 8, 1947 |